US008483675B2

(12) United States Patent
Chung et al.

(10) Patent No.: US 8,483,675 B2
(45) Date of Patent: Jul. 9, 2013

(54) SYSTEM, METHOD, AND MEDIUM FOR MANAGING CONVERSATIONAL USER INTERFACE ACCORDING TO USAGE PATTERN FOR PORTABLE OPERATION

(75) Inventors: Seung-nyung Chung, Seoul (KR); Kee-eung Kim, Seoul (KR); Joon-ah Park, Seoul (KR); Wook Chang, Seoul (KR); Sung-jung Cho, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 667 days.

(21) Appl. No.: 11/169,801

(22) Filed: Jun. 30, 2005

(65) Prior Publication Data

US 2006/0079201 A1    Apr. 13, 2006

(30) Foreign Application Priority Data

Aug. 26, 2004   (KR) .................. 10-2004-0067430

(51) Int. Cl.
*H04M 3/00* (2006.01)
(52) U.S. Cl.
USPC ......... 455/418; 455/414.1; 709/220; 709/221
(58) Field of Classification Search
USPC ....................................................... 455/418
See application file for complete search history.

(56) References Cited

U.S. PATENT DOCUMENTS

| 6,016,342 | A | 1/2000 | Schwartz et al. | |
|---|---|---|---|---|
| 6,084,954 | A | 7/2000 | Harless et al. | |
| 6,505,167 | B1 * | 1/2003 | Horvitz et al. | 705/9 |
| 2003/0093370 | A1 | 5/2003 | Choi | |
| 2004/0250107 | A1 * | 12/2004 | Guo | 713/200 |
| 2004/0259515 | A1 * | 12/2004 | Hwang | 455/231 |
| 2005/0054381 | A1 * | 3/2005 | Lee et al. | 455/557 |
| 2005/0132014 | A1 * | 6/2005 | Horvitz et al. | 709/206 |
| 2008/0212535 | A1 * | 9/2008 | Karaoguz et al. | 370/331 |

FOREIGN PATENT DOCUMENTS

| JP | 07-160462 | 6/1995 |
|---|---|---|
| JP | 08-055130 | 2/1996 |
| JP | 2001-203811 | 7/2001 |

(Continued)

OTHER PUBLICATIONS

Office Action issued on Dec. 29, 2005 from European Patent Office.

(Continued)

*Primary Examiner* — Kiet Doan
*Assistant Examiner* — Mazda Sabouri
(74) *Attorney, Agent, or Firm* — Staas & Halsey LLP

(57) ABSTRACT

An automated mobile operating method, medium, mobile system, and mobile phone extracting a pattern of operation of a mobile device based on operational data for the mobile device, comparing the pattern and the operational data of the mobile device to determine whether the pattern is a new pattern not previously recognized for the mobile system, and initiating a dialogue with the user to record information for the new pattern or determining whether to initiate a dialogue with the user regarding the pattern based on an element of a corresponding rule being met for the pattern, and performing the dialogue with the user, when initiated, requesting guidance on implementation of an operation of the mobile device based on the pattern. The initiating of the dialogue may be delayed based upon an operational state of the mobile device, and the delaying may be overridden based upon an urgency of the dialogue.

49 Claims, 7 Drawing Sheets

FOREIGN PATENT DOCUMENTS

| | | |
|---|---|---|
| JP | 2003-111157 | 4/2003 |
| JP | 2004-518206 | 6/2004 |
| JP | 2004-185612 | 7/2004 |
| KR | 10-2003-0038348 | 5/2003 |
| WO | WO02/057899 | 7/2002 |
| WO | 03/043356 | 5/2003 |
| WO | 2005/025081 | 3/2005 |

OTHER PUBLICATIONS

Korean Office Action issued Mar. 24, 2206 in Korean Patent Application No. 10-2004-0067430.

Japanese Office action for correspondent Patent Application No. 2005-245461 dated Aug. 29, 2008 (2 pages).

* cited by examiner

SYSTEM, METHOD, AND MEDIUM FOR MANAGING CONVERSATIONAL USER INTERFACE ACCORDING TO USAGE PATTERN FOR PORTABLE OPERATION

CROSS-REFERENCE TO RELATED APPLICATIONS

This application claims the benefit of Korean Patent Application No. 2004-0067430, filed on Aug. 26, 2004, in the Korean Intellectual Property Office, the disclosure of which is incorporated herein by reference.

BACKGROUND OF THE INVENTION

1. Field of the Invention

Embodiments of the present invention are drawn to systems, methods, and media, recognizing patterns and providing appropriate responses, and more specifically, to systems, methods, and media harmonizing implicit usage pattern analysis for portable devices, potentially with explicit user input, in order to adaptively recognize and/or anticipate a user's desired action based on a detected pattern extracted from correlated data and the potential user input after deployment of the portable devices.

2. Description of the Related Art

Previously, portable devices were primarily for performing core operations, e.g., operating as a telephone in mobile phones, scheduling/addressing in personal data assistants (PDAs), or data processing in mobile computer, e.g., laptops. Inherently the mobile computers have greater capabilities than mobile phones or PDAs, but recently all types of portable devices have been incorporating greater and greater numbers of none core capabilities. For example, mobile phones have incorporated calendar functions, text messaging, email functionality, and multimedia interactivity. Similarly, PDAs may be able to perform such operations, as well as some operations of the mobile phones, e.g., telephone operations. Similarly, mobile computers are also now incorporating mobile telecommunication capabilities, such as wireless LAN and mobile internet communication. Thus, there is now somewhat of a synergy between the portable devices, providing greater capabilities, based mostly on the available processing power of each device and corresponding power supply constraints.

However, with these additional capabilities unanticipated problems have arisen. Primarily, because of the portable nature of these devices, differing internal and external environmental conditions/events are encroaching on the benefits of having the additional capabilities or at least making the lack of interoperation between the separate capabilities more noticed. For example, though a mobile phone may have variable ring setting levels, e.g., outside, inside, or meeting, there is no way to enable an automated setting of the different ring preferences and instituting of the change from one setting to another based on an internal or external environmental condition/event, i.e., there is no automated way to set a ring preference and there is no automated way to subsequently institute the change. Essentially, the addition of all the capabilities to the portable devices has actually created additional problems in that there is no current automated way to integrate the different capabilities.

As noted above, conventionally, most user interactions with these additional capabilities, e.g., a particular operation happening based upon a particular item in an address book or calendar or a mobile phone's ring volume being based on user location, have only been modifiable based on an initiation from a user. The user, or manufacture, must set initial preferences and linkages between the different capabilities/applications in the portable device and desired operations. Thus, if a user typically enters a meeting at a certain time identified in a calendar and desires the mobile phone ring tone to be set to 'meeting' (perhaps vibration only), then the user has to initiate the setting of the user settings. Then, the operation of that user setting will continue until the user changes the setting. Similarly, if the physical location of the user is determined to have changed, e.g., the user has left the meeting, there is no automated way to set up a desired changing of the phone ringer back to a normal or non-meeting setting. The user must initiate the setting of such a change.

Thus, there is no current way for a portable device to learn before and after deployment/setting. Currently, portable devices must be taught before deployment, i.e., during manufacture or by a user before occurrence of the aforementioned environmental conditions, i.e., currently there is no proactive learning and there is no corresponding automated initiation of operations based on that learning. Therefore, embodiments of the present invention solve for at least this deficiency for portable devices by implementing a pattern analysis of the portable device's operations and automating an initiation of operations based on the pattern analysis.

SUMMARY OF THE INVENTION

Embodiments of the present invention set forth a mobile system, medium, method, and mobile phone adaptively recognizing and/or anticipating actions based on a detected pattern extracted from correlated data and the potential user input after deployment of a corresponding portable device To achieve the above and/or other aspects and advantages, embodiments of the present invention set forth a mobile system, including a pattern extractor module to detect a pattern of operation of a mobile device based on operational data for the mobile device, a pattern analyzer module to compare the pattern and the operational data of the mobile device to determine whether the pattern is a new pattern not previously recognized for the mobile system, and to initiate a dialogue with a user to record information for the new pattern or determining whether to initiate a dialogue with the user regarding the pattern based on an element of a corresponding rule being met for the pattern, and a character agent module to initiate the dialogue with the user requesting guidance on implementation of an operation of the mobile device based on the pattern.

The determining of whether to initiate the dialogue may further include basing the determination of whether to initiate the dialogue on a probability factor stored in the mobile system indicating a probability that the user would prefer the operation of the mobile device be automatically implemented without dialogue. The probability that the user would prefer the operation of the mobile device be automatically implemented without dialogue can be based on previous repetitive approvals by the user of previous dialogues regarding the pattern.

The probability factor may further identify a reluctance of the user to implement the operation of the mobile device and/or receive the dialogue. The probability factor may identify the reluctance of the user to implement the operation of the mobile device and/or receive the dialogue is based on previous repetitive disapprovals by the user of previous dialogues regarding the pattern.

The rule may be a multi-element rule requiring at least two elements to be met for the pattern to match a previously known pattern of the mobile system.

The mobile system may further include a device sensor system including at least one of a location information sensor module to determines a location of the mobile device, a time sensor module to determine a current time, an agenda sensor module to determine a current and upcoming agenda for the user from an agenda database stored in the mobile system, a contacts sensor module to extract a contacts' phone number and additional information from a contacts database stored in the mobile system, and/or a call log sensor module to extract time, duration and contact information from a call log stored in the mobile system.

The pattern extractor module may compare operational data of at least one of at least one location data, at least one current time data, at least one agenda data, and/or at least one call log data and contacts data for the mobile device to extract the pattern. The pattern analyzer module may further compare the operational data with the rule to determine whether a current user behavior is contrary to the rule, indicating the pattern is the new pattern, whether the pattern is the new pattern based on repetitive user behaviors and also indicating a new rule, or whether the user's next action will be strongly predicted according to the pattern and based on the rule being met.

The character agent module may modify an appearance and behavior of a character agent interacting with the user.

The mobile device may also be a mobile communication system. When the rule may correspond to anticipating a next cell station or next mobile device location based on the pattern, and the character agent module may initiate the dialogue with the user regarding the next cell station or next mobile device location. The rule may also corresponds to agenda information and time information to anticipate a change in a messaging alert operation of the mobile device and automating the change in the messaging alert operation. The automating of the change in the messaging alert operation may include initiating the dialogue with the user as to whether to change the messaging alert operation of the mobile device based on previous changing of the messaging alert operation upon similar agenda information and time information.

In addition, the rule may corresponds to at least two of call log information, contact information, and time information to anticipate a user's next messaging operation based on previous messaging operations. Upon anticipating the user's next messaging operation, there may be an initiating of the dialogue with the user as to whether to initiate the next messaging operation.

A user response to the dialogue initiation may include one of pressing an OK button, pressing a cancel button, ceasing operation of the mobile device, and manually inputting a response in a text box.

The initiating of the dialogue by the character agent module may be delayed based upon an operational state of the mobile device. In addition, the operational state may include at least one of a current occurrence of a call operation, a data transmission operation, and whether the mobile device is in a stand-by mode. Further, an urgency of the dialogue may determine whether the character agent module delays initiation of the dialogue, thereby overriding the delaying based upon the operational state of the mobile device. Here, urgencies of potential dialogues may also be set by a user to override the delaying based upon the operational state of the mobile device. When the character agent module overrides the delaying of the dialogue and initiates the dialogue, the dialogue may also be initiated through a beeper of the mobile device. Similarly, when the character agent module overrides the delaying of the dialogue and initiates the dialogue, the dialogue may be initiated through a vibrator of the mobile device.

To achieve the above and/or other aspects and advantages, embodiments of the present invention may further set forth an automated mobile operating method, including extracting a pattern of operation of a mobile device based on operational data for the mobile device, comparing the pattern and the operational data of the mobile device to determine whether the pattern is a new pattern not previously recognized for the mobile system, and initiating a dialogue with the user to record information for the new pattern or determining whether to initiate a dialogue with the user regarding the pattern based on an element of a corresponding rule being met for the pattern, and performing the dialogue with the user, when initiated, requesting guidance on implementation of an operation of the mobile device based on the pattern.

The method may further include determining a location of the mobile device, determining a current time, determining a current and upcoming agenda for the user, extracting a contacts' phone number and additional information from a contacts database, and/or extracting time, duration and contact information from a call log.

To achieve the above and/or other aspects and advantages, embodiments of the present invention set forth a medium including computer readable instructions implementing embodiments of the present invention.

To achieve the above and/or other aspects and advantages, embodiments of the present invention set forth a mobile phone including computer readable instructions implementing embodiments of the present invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
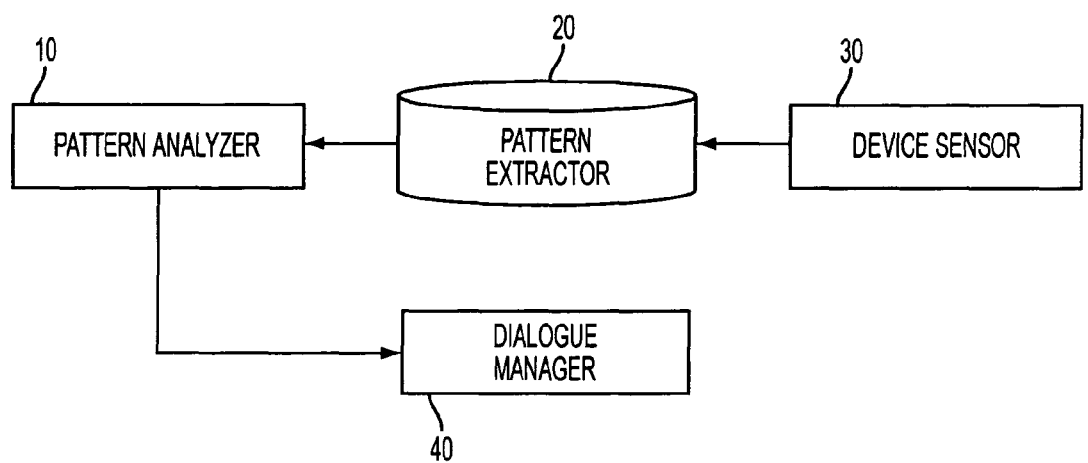
FIG. 1 is a block diagram schematically illustrating a system for managing conversational user interfaces, according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Portable devices have recently been incorporating more and more different capabilities, without sufficient controlled interaction between the different capabilities. The following embodiments will primarily reference mobile phones as an example of a portable device, but embodiments of the present invention are not limited to the same. As many different portable devices suffer from the same conventional drawbacks, embodiments of the present invention can be equally applied as needed.

In mobile phones, there are many different additional capabilities in addition to merely performing telephone communication. Such capabilities include calendar functions, text messaging, email functionality, multimedia interactivity, and location determination, e.g., through GPS or cell station IDs. The individual operations of these different capabilities can be defined by user preference settings. As only an example, some user preference settings have conventionally included power-on lock, key pad lock, time and date, language, greeting, back light, contrast, system select, private network, public network, phone silent, ring tone, ring volume, vibrate, ear volume, key sound, access tone, minute alert, tone send, message alert, profiles, activation, screen calls, and next call type.

Similarly, conventionally, depending on a condition or state of specified conditions or events a user or manufacturer can initially set particular operations to occur upon such specified conditions of events based on the user preference settings. According to embodiments of the present invention, specified conditions could include: calendar items, such as working hours, non-working hours, traveling times, and dates, vacation dates, meeting hours, weekend and holiday dates, other calendared meetings or items; telephone battery conditions, e.g., battery high, battery low, etc.; differing network detections, from private internal wireless networks, public networks, or LANs; the detection between different cellular networks or cells; detecting whether/which callers are listed in an address book; and/or the detection of the mobile phone's location based on the above different network detections, cellular network or cells, or GPS, for example. Such specified conditions can include the detection of one of the conditions or a change from one condition to another, for example, noting that the above list is not exhaustive of all potential specified conditions. Further, the happening of a condition, or a change in conditions, can also be referred to as an event, though the referenced use of event or condition in the present application may be interchangeable.

As noted above, these conditions/preferences are already specified, either by the user or manufacturer before deployment. Thus, upon deployment the mobile phone may conventionally only perform particular functions upon the occurrence of particular conditions based on particular user preferences. Any further modification of the user preferences/conditions to perform differently upon a condition happening must be reset. There is no learning capability while the mobile phone is deployed and there is no automated initiation of operations or further preference/condition modifications based on any pattern analysis of the operation of the mobile phone.

These conventional deficiencies have been overcome by the following embodiments of the present invention.

Accordingly, FIG. 1 illustrates a system including a pattern analyzer 10, a pattern extractor 20, a device sensor 30, and a dialogue manager 40, according to an embodiment of the present invention. The device sensor 30 can sense input to the system, and provide or make available the sensed result to the pattern extractor 20. The pattern extractor 20 can extract a pattern based upon the sensed result to the pattern analyzer 10, and the pattern analyzer 10 can then analyze the extracted pattern and provide the analyzed result to the dialogue manager 40. The dialogue manager 40 thereafter determines an appropriate dialogue, if necessary, to send to the user based upon the analyzed result. Here, the pattern analyzer 10, the pattern extractor 20, the device sensor 30, and the dialogue manager 40 may be embodied in a single mobile device, e.g., a mobile phone. Alternatively, as an additional example, the device sensor 30 can be embodied in the mobile phone and the pattern analyzer 10, the pattern extractor 20, and the dialogue manager 40 may be embodied in a separate remote device(s). In this case, if the mobile phone does not have sufficient processing power, computations can be performed at the remote device and transmitted back to the mobile phone. Alternative arrangements are possible, based on differing available processing capabilities, device power constraints, or other reasons for selectively performing different operations locally or remotely for implementation on the mobile device.

Figure 2:
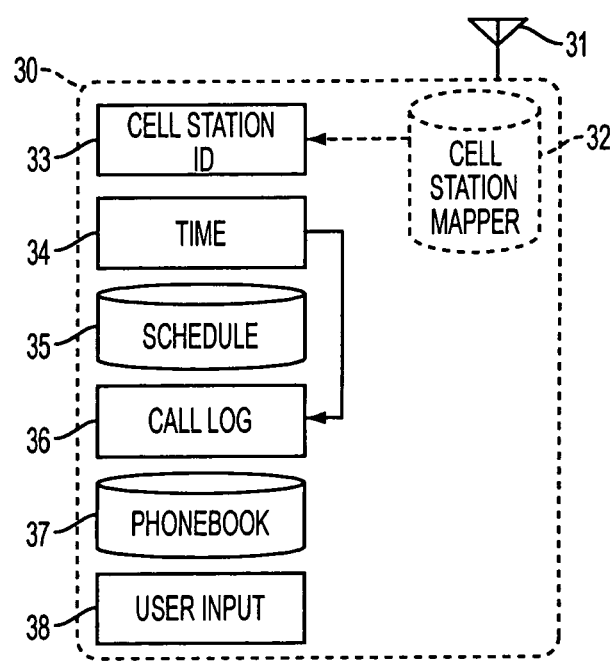
FIG. 2 illustrates a device sensor, according to an embodiment of the present invention.

An example of the device sensor 30 is illustrated in FIG. 2. The device sensor 30 captures raw data events from inside and/or outside the device. The sensor 30 converts and transfers the event information to the pattern extractor 20. By way of example, in Table 1 below, the captured events could include a time stamp representing the capture time information at which a condition (hereinafter referred to as an 'event') occurs. An event type can also be captured to categorize what has occurred at each time. Factors 1 and 2 can further be captured to capture factors relevant to the event type, e.g., from the event type 'Call', the corresponding time stamp is noted, along with the corresponding phone number, and length of the phone call. The event type 'Cell-Station-Changed' corresponds to a current cell station upon a cell station having changed, with the Factor 1 being the station ID of the current station captured. When a change in mode is made, the time can also be recorded. Further, while Table 1 shows only two factors, it is understood that additional factors can be used, or that only a single factor need be recorded for all or particular events, according to aspects of the invention. Moreover, additional event types can be used and embodiments of the present invention are not limited to the event types set forth in Table 1.

TABLE 1

| Time stamp | Event type | Factor #1 | Factor #2 |
|---|---|---|---|
| 20040802 07:32 | Cell-Station-Changed | 12345 | |
| 20040802 07:36 | Cell-Station-Changed | 12346 | |
| 20040802 11:02 | Call | 010-xxxx-xxxx | 03:54 |
| 20040802 15:27 | PhoneNumberSaved | 010-oooo-oooo | Michael |
| 20040802 19:10 | Manner-Mode-Set | | |
| ... | ... | ... | ... |

Specifically, regarding the device sensor 30 shown in FIG. 2, a signal can be received and transmitted through an antenna 31, e.g., using a cell station manager 32. A controller (not shown) of the device sensor 30 can detect, from the cell station manager 32, the cell station ID and stores the cell station ID in memory 33. As noted above, the device sensor 30 may also record information about a time of a call in time memory 34. Further, a schedule may be stored in a schedule memory 35, a log of calls made using the device sensor 30 may be stored in call log memory 36, a phone book of stored numbers used by the device sensor 30 may be stored in memory 37, and specific input user data may be stored in user input data in memory 38.

Other aspects of the device sensor 30 needed to make phone calls, such as key pads and/or displays, are not shown in FIG. 2 for the purpose of clarity. It is also understood that any of the memories 33, 34, 35, 36, 37 and 38 need not be used in all aspects of the invention, or limited thereto, and/or can be supplemented through the use of external data input. By way of example, the user schedule stored in schedule memory 35 and/or phonebook stored in phonebook memory 37 could be input or accessed through programs such as Microsoft Outlook, the Palm Desktop or other such electronic schedulers which offer a more convenient mechanism by which to input or record complex scheduling and phonebook data. In another embodiment of the present invention, any of the memories 33, 34, 35, 36, 37 and 38 may be remote from the mobile phone, or selectively included within the mobile phone or a remote site, and/or the memories 33, 34, 35, 36, 37 and 38 may access additional memories storing more complete stored data, e.g., a mobile phone may include a separate memory for schedule information and schedule memory 35 may access the same.

Figure 3:
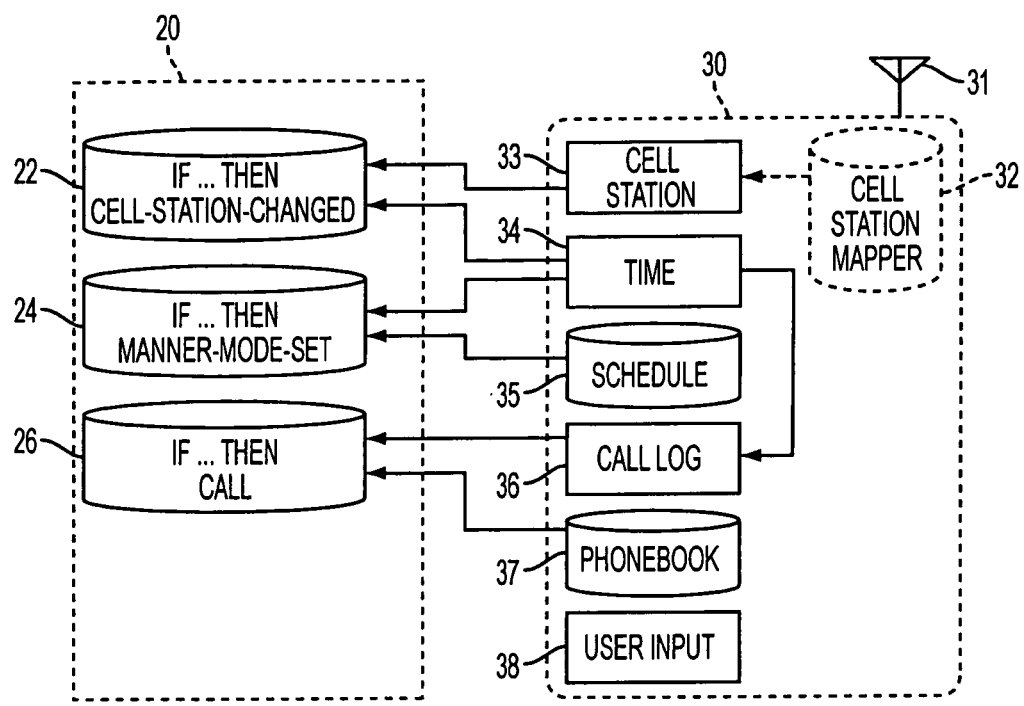
FIG. 3 illustrates a device sensor interacting with a pattern extractor, according to an embodiment of the present invention.

FIG. 3 illustrates an interaction between the device sensor 30 and the pattern extractor 20, according to an embodiment of the present invention. The pattern extractor 20 may extract pattern data from repetitive user behaviors, which can be assumed with the time-series (dynamic) data from device sensor 30. The pattern extractor 20 can further extract useful information from non-time-series (static) data such as a schedule or a phonebook, noting that the same can also be implemented as non-time-series changes.

As an example, the pattern extractor 20 may store rules 22, 24, 26, which could be rules extracted after analysis of raw data stored in memories 33 through 38. Here, using Table 1 and FIG. 3, it can be determined from the time memory 34 and from the cell station ID memory 33 that a cell station has changed, with the factor number 1 ('12345'), identifying the new cell station. It can further be detected at another time stamp read from the time memory 34 and the cell station ID 33 that a further cell station change has occurred, e.g., factor number 2 of the second time stamp of Table 1 being cell station ID '12346.' In this way, the rule extractor 20 is able to extract a rule 22 which links the time and cell station ID data stored in memories 33 and 34 in order to determine whether an event type such as a change of cell station has occurred.

Similarly, the time information stored in time memory 34 and a call number information stored in call log memory 36 can be used to determine whether a call has been placed, and at what time the call was made. This data can be used by the pattern extractor 20 to extract the if/then rule 26, predicting when a phone call may be placed in the future, thereby extracting a pattern of when phone calls are made or when phone calls are made to particular individuals.

The pattern extractor 20 may also extract rule 24, in regards to a current time stored in time data memory 34 as well as a schedule and schedule memory 35, in order to determine whether/when a manner mode should be set, for example, based upon whether a user in the past has set a manner mode for certain types of scheduled events (e.g. such as meetings). It is further understood that the pattern extractor 20 could extract additional or different rules based upon review of the raw data stored by the device sensor 30.

As an example of another rule, an IF-THEN rule could be implemented using a sequential pattern mining algorithm. Such a rule could be: if "Cell-Station-Changed=12345" and "Cell-Station-Changed=12346" then "Cell-Station-Changed=12347" (Support=0.05, Confidence=0.6), i.e., there is a chance of 0.05 that the cell station ID change will be the sequence of "12345", "12346" and "12347" (the support denotes the significance of the rule), and there is a chance of 0.6 that the cell station ID change will be "12347" given that the previous cell station ID changes were "12345" and "12347" (the confidence denotes the certainty of the THEN clause)

Now that the collection of raw data and extraction of rules have been explained, with reference to FIGS. 2 and 3, automated interactions with a user and/or automated actions will be further explained with reference to FIGS. 4-6.

Figure 4:
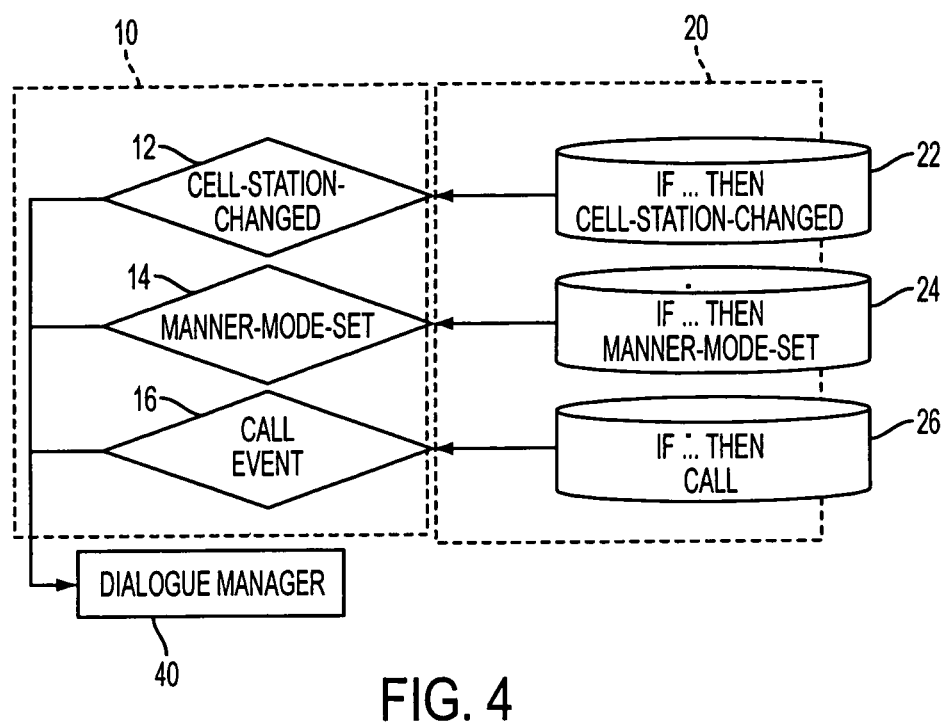
FIG. 4 is a block diagram illustrating an interaction between a pattern extractor and a pattern analyzer, according to an embodiment of the present invention.

FIG. 4 illustrates the pattern analyzer 10 and the pattern extractor 20, according to an embodiment of the present invention. In this example, the pattern analyzer 10 may include a cell station change event detector 12, a vibration pattern event detector 14, and a call pattern detector 16. The cell pattern event detector 12 detects results of the if/then rule change output from the rule 22 of the pattern extractor 20. If the cell station change event occurs, due to a change in the cell station ID detected by the rule 22, the cell pattern event detector 12 can output an indicator to a dialog manager 40 that the cell station has been changed. Similarly, the vibration pattern event detector 14 can detect the result of the if/then vibration rule 24, identifying whether a manner mode is likely to be set. Thus, if the if/then rule is satisfied, the vibration pattern event detector 14 outputs an indicator to the dialog manager that the manner mode may be set. Likewise, the call pattern event detector 16 may determine from the if/then call rule 26 whether or not a call has been made to a particular person at a particular time, e.g., the call wasn't made by usually is. If this if/then rule is satisfied, the call pattern event detector 16 forwards an indicator to the dialog manager 40 that a similar particular call may be desired. Although FIG. 4 only illustrates 3 event detectors 12, 14, 16, it is understood that multiple and/or different event detectors can be implemented, e.g., based upon the number of rules existing and newly implemented in the pattern extractor 20.

Figure 5:
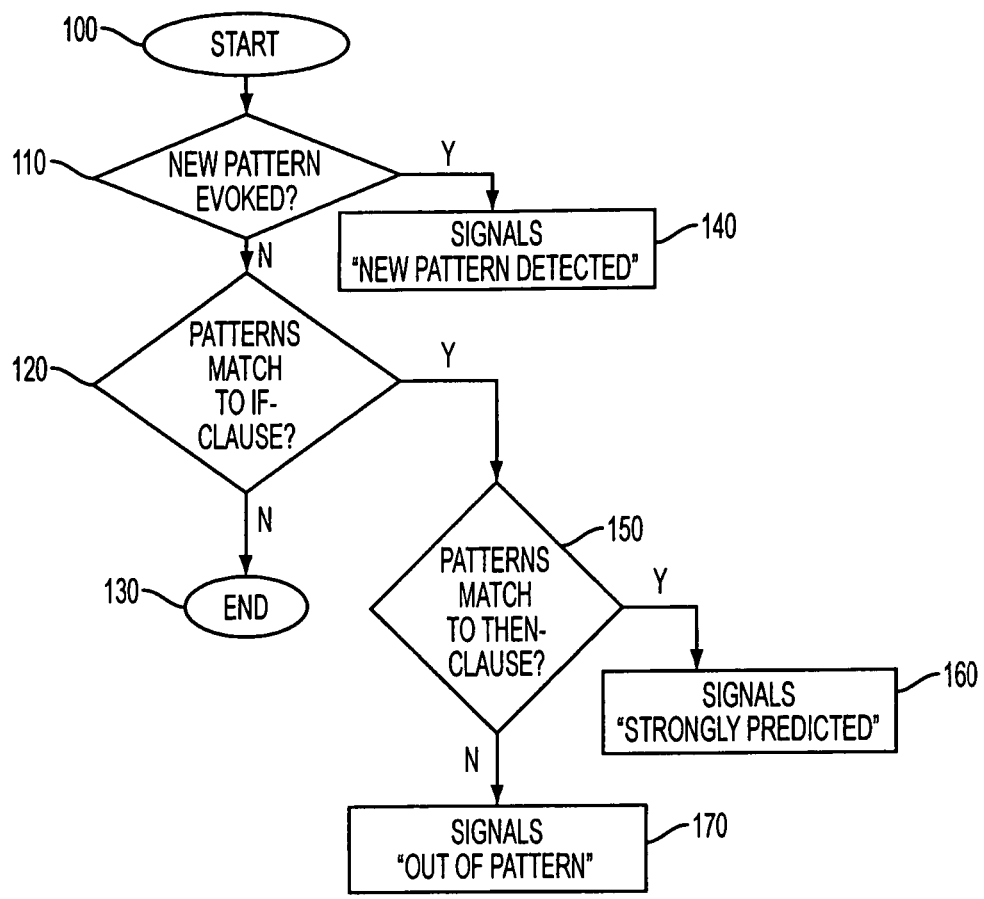
FIG. 5 is a flow chart for a pattern analyzing method, according to an embodiment of the present invention.

A flowchart of a pattern analyzing method is shown in FIG. 5, according to an embodiment of the present invention. As shown, the pattern analyzer 10 can identify events when a user's present behavior deviates from an extracted pattern, such that a new pattern can be found by the user's new repetitive behaviors, and/or a user's intended action can be strongly predicted according to the extracted pattern not being deviated from.

As shown in FIG. 5, the pattern analyzer 10 is able to both detect new patterns based upon the rules extracted in the pattern extractor 20, and is also able to determine whether one of the already detected patterns is strongly indicative of future behavior or is indicative of whether future behavior is not likely to occur. Specifically, the pattern extractor 10 starts the process at operation 100 by detecting patterns, e.g., from the rules stored in the pattern extractor 20 and/or a combination of raw data detected by pattern extractor 20. In operation 110, the pattern analyzer 10 recognizes whether a new pattern is detected, and then signals that a new pattern has been detected, in operation 140. As such, and as will be described more fully below, the user can be given an option as to how the new pattern is be accounted for, through new dialogs or new actions. Conversely, if the pattern adheres to a preexisting rule, the pattern analyzer 10 then determines whether the 'if' portion of the if/then rule has been satisfied, in operation 120. If the condition predicate (i.e. the 'if' portion of the clause) is not satisfied the pattern analyzer determines that no preexisting pattern has been detected, in operation 130.

However, if the pattern analyzer determines in operation 120 that the 'if' clause has been satisfied, the pattern analyzer 10 then determines in operation 150 whether or not the 'then' clause has been satisfied. Specifically, if the pattern analyzer 110 determines in operation 150 that both the 'if' and the 'then' clauses of the rule detected from the pattern extractor 20 are satisfied, the pattern analyzer determines that the detected raw data is a strong predicator that an event is going to occur, in operation 160. However, if the 'then' clause is not satisfied, as determined in operation 150, then the pattern analyzer 110 determines that the raw data captured is not a strong indicator that a future event will occur, in operation 170. In this way, the pattern analyzer 10 is able to determine whether a user's present behavior deviates from an extracted pattern, is able to detect when a new pattern has been found based upon repetitive user behavior, and is also able to determine whether or not the user's likely next action, based upon a combination of events, is strongly predicted according to the extracted pattern boundary.

The strength of the predictor can be recorded to strengthen or weaken the probability of the detected pattern reoccurring. Based on such a probability, particular actions can be automatically implemented if the probability is high, or dialogs can be instituted to confirm the particular action if the probability is not at least a predetermined level, for example. As the user acknowledges the implementation of the action, the probability of that action being implemented automatically increases, i.e., the probability may increase over the predetermined level. Similarly, if a user routinely changes/cancels an automated action during the existence of the pattern, i.e., the user is evidencing a lack of interest in the automated action, the probability may be decreased. When the probability decreases below the predetermined level dialogs requesting confirmation of the action may be reinstituted. Further, if the user routinely declines the implementation of the action the action and/or pattern may be removed or suspended.

Figure 6:
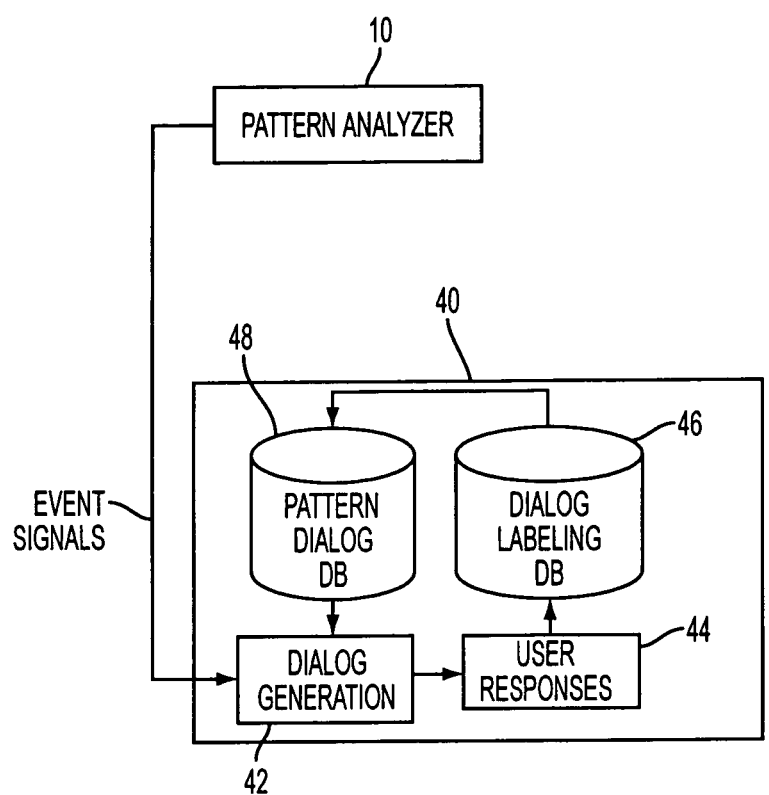
FIG. 6 is a block diagram illustrating an interaction between a pattern analyzer and a dialog analyzer, according to an embodiment of the present invention.

FIG. 6 shows a dialogue manager (also referred to as a character agent module) 40, according to an embodiment of the present invention. The character agent module 40 initiates, when an event is triggered, an appropriate dialogue in order to guide the user's explicit input, according to a predefined dialogue database. As shown, the character agent module 40 includes a dialog generation unit 42, a user responses module 44, a dialog labeling database 46, and a pattern dialog matching database 48. The dialog generation unit 42 may receive the event signals from the pattern analyzer 10 indicating that a pattern has been detected and a strong indication that a future event will occur based on the user's behavior. The dialog generation unit 42 may then output, through a display of the device sensor 30, for example, a predetermined dialog based upon the event signal.

By way of example, if the time stored in the time ID data memory 34, and a schedule stored in the schedule data memory 35, indicate, through the pattern extractor 20 and the pattern analyzer 10, that an event is to occur, e.g., for a meeting, the dialog manager 42 may output a dialog as follows: "meeting started. Would you like to set a manner mode?" Based upon the output dialog from the dialog generation 42, the user provides some sort of response. In this example the response could be "yes, no, or ignore." However, it is understood that other types of responses can occur, such as the turning off of the unit or other such indications. Based upon the user response, detected by the user response receiver 44, the dialog manager 40 produces a dialog label for a particular set of events. By way of example, and as shown in Table 2, the dialog labeling database might include a label that is input by the user which labels a particular location based on the cell station ID or may input a name associated with a particular called, based upon the user response and after initiation by character agent module 40, detected by the user response receiver 44. In addition, when no labeling is further required, the accuracy of the rule as well as the accompanying dialog can be stored as a pattern in dialog database 48, which is used by the dialog generation unit 42 to output the proper dialog associated with each particular event signal.

TABLE 2

| Raw Data | Label |
|---|---|
| Cell Station id: 12347 | Workplace |
| Phone#: 010-oooo-oooo | Michael |

By way of example and as shown in Table 3 below, the pattern dialog database 48 may include a dialog for when a user has ventured into a new area. For example, if the event that occurred is a change of cell station and the event signal is that the pattern does not match a known location, the dialog could be programmed to request that the user indicate the new location. While not required, a weighing factor P is further included in the database 48 such that if the user has typically responded to a particular dialog, the dialog is continued. However, when the user has not responded to the dialog, the P number can be reduced in order to prevent the system from outputting dialogs not desired by the user, similar to above.

TABLE 3

| THEN-clause | Event signals | Dialog Contents | P (Dialog Contents) |
|---|---|---|---|
| Cell-Station-Changed (34562) | (1) Out of Pattern | "Huh? I've never been at this place before. Where am I?" | 1.0 |
| Cell-Station-Changed (12347) | (2) New Pattern Detected | "You seem to be around here quite often. Where am I?" [ ] | 1.0 |
| Cell-Station-Changed (86356) | (3) Strongly Predicted | "Welcome to [ ]" | 1.0 |

By way of further example, the pattern database 48 might determine from a cell station change that a new pattern has been detected and that a user has been to a particular location often. In this event, the dialog output through the dialog generation unit 42 indicates that the user has been in this particular location before and requests a label for this location for storage in the dialog labeling database 46. As such, if the user goes to a particular location often and the location is improperly labeled, the dialog generation unit is able to detect from an event change (i.e. a cell station has been changed) that a particular location is known and labeled, then the dialog generation may output a dialog such as "welcome to the particular location." It is also understood multiple rules and dialogs can be developed or input by a user in different embodiments of the present invention.

Figure 7:
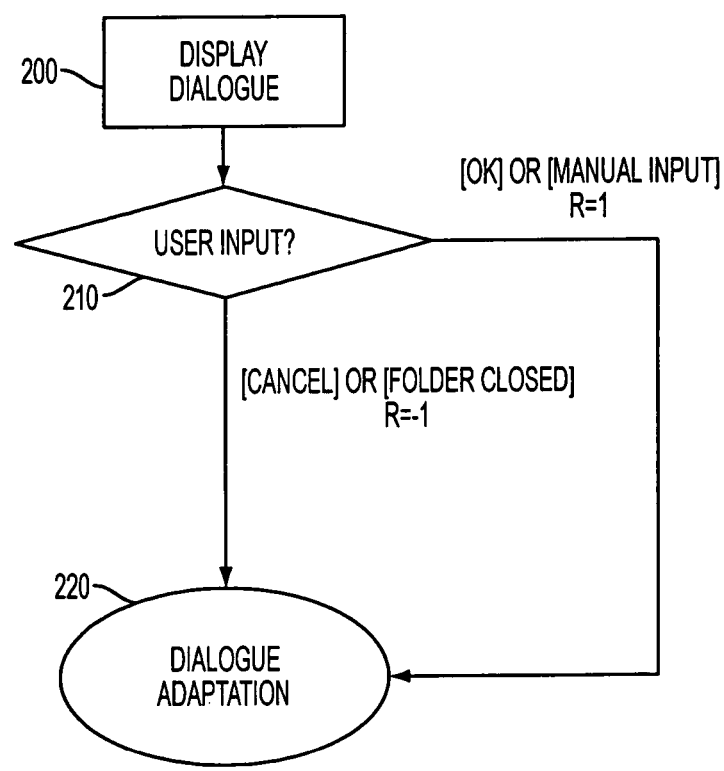
FIG. 7 is a flow chart for a dialog managing method, according to an embodiment of the present invention.

While not required in all aspects of the invention, the dialog manager 40 can improve the dialog output through the dialog generation unit 42 by rating the stored dialog to be used against past user behavior. Specifically, and as shown in FIG. 7, the dialog manager 40 may determine, after a dialog has been displayed in operation 200, whether there has been user input, in operation 210. If the user has input an indication such as 'ok' or 'yes,' an R value may be added to the P valued stored in the database 48. This R value indicates that the user desires this type of dialog in the future. If in operation 210 the user hits 'cancel' or indicates 'no,' a negative R value can be applied to the P stored in the database 48, thereby indicating that a particular dialog is no longer desired or is not highly accurate. The resulting R value from the user input operation 210 can be stored in a dialog adaptation routine 220, and the P value stored in the patterned dialog database 48 can be adjusted according to user preference.

By way of further example, in an embodiment of the present invention, an event could trigger the following dialogue: "Meeting Started. Would you like to set to manner mode?" The pre-defined possible responses for this dialogue could be "Yes/No/Ignore." Additional examples are shown above in Tables 2 and 3. In Table 2, the examples pertain to a dialogue labeling database as shown in FIG. 6, and in Table 3, the examples also pertain to a pattern to dialog database as shown in FIG. 6.

With further reference to Tables 2 and 3, when user behavior is contrary to the extracted pattern, i.e., where the 'THEN'-clause dictates a cell station change, and the change is different from the current cell station ID, the dialogue can be "Huh? Huh? I've never been at this place before. Where am I?" The predefined responses could be: "Type in/Cancel/Ignore." Additionally, where the 'THEN'-clause dictates the making of a call, but the user doesn't make the call, the dialogue could be "Well, I thought you're gonna call Jane around this time . . . ," and the predefined responses could be: "Thanks/No/Ignore."

When a new pattern is found from repetitive user behaviors, the 'THEN'-clause may indicate that a cell station change, e.g., using the following dialogue: "You seem to be around here quite often. Where am I?" The predefined response could be: "Type in/No/Ignore." Additionally, if the 'THEN'-clause dictates the making of a call, the dialogue can be "You call Jane quite often. What is she?" The predefined response could be: "Type in/No/Ignore."

When a user's next action is strongly predicted, according to an extracted pattern, the 'THEN'-clause could indicate a cell station change by comparing, by way of example, a subway station and a cell station ID map to enable the mobile phone to announce the next subway station, e.g., using the following dialogue: "Next station is City Hall. The exit is on your left." The predefined response could be: "Thanks//No/Ignore." When a 'THEN'-clause indicates the changing of the mobile phone to the manner mode, the dialogue could be "Meeting started. Would you like to set to manner mode?" The predefined responses could be "Yes/No/Ignore."

Such dialogues may be delayed until a user is not available, e.g., so not to interrupt the user or interrupt other operations of a portable device. For example, the dialogue manager may sense whether, a folder/flip top of the portable device is open or closed, i.e., whether the portable device is in a stand-by mode. When the folder/flip top is open a predetermined length of time, e.g., a second, the dialogue manager may then display a dialogue. In such a case, the dialogue manager may also determine whether the display of the dialogue is relevant, e.g., if a long period of time has passed since the dialogue would have immediately been displayed, the dialogue may not be relevant at a later time.

Similarly, immediate display of dialogues may be delayed if the dialogue manager detects a call is in progress, and may subsequently display the dialogue immediately after the call is over, or after a predetermined length of time, e.g., a second has lapsed. Further, if the portable device is being used to transmit a message/file/multimedia, the display of the dialogue may also be temporarily delayed. Additional operations may be set to delay an immediate display of a dialogue, either by a manufacturer or manually by a user of the portable device, for example.

In addition, there may be a hierarchy for delays of dialogues, i.e., some dialogues may have greater urgency over other dialogues. For example, if a user of a portable device always has a meeting, or phone call, or travel itinerary, a dialogue to the user of the upcoming occurrence of the meeting, call, or travel may override other delay settings and be provided to the user immediately. As another example, if a user's next action is strongly predicted, and the user diverts from this prediction, this diversion may be considered an urgent dialogue and immediately displayed.

Thus, in the urgent dialogue display, even if the portable device is not open, a call is in progress, or a message is be transmitted, an urgent dialogue or alarm, e.g., a vibrator (or a beeper) of the portable device, can be immediately instituted to inform the user of the current urgent situation. Similar to above, the hierarchy of delays, or the determination of what would be considered urgent, can be set by a manufacture or user, for example.

Embodiments of the present invention can perform adaptive learning, e.g., to reinforce the dialogues. As shown in FIG. 7, Dialogues can be selected based on a probability distribution P (Dialogue). Thus, if the user presses the cancel button or closes the folder, P (Dialogue) decreases. Similarly, if the user presses the ok button or performs a manual input, P (Dialogue) increases. In this way, the accuracy of the dialogue is increased. Similar to above, if P increases to a sufficiently high level then dialogs may not be further necessary and the underlying action may be automatically implemented. The sufficient level (predetermined level) can be determined through experimentation and may be different for different environments/conditions/events.

Embodiments of the present invention include methods harmonizing explicit user input and implicit usage pattern analysis after deployment of the applied systems, especially for mobile devices, in order to adaptively recognize user's intention in most every possible context and proactively suggest useful services by automated initiating of dialogues. Embodiments of the present invention extract usage patterns by combining raw data, such as location data (e.g., GPS or nearby cellular station IDs), call data, schedules, phone book entries, time stamps, etc. By way of example, location data can be combined with a time stamp to reveal traveling patterns of the user. By way of another example, a schedule can be combined with a time to determine if the schedule contains a 'meeting' such that a manner mode should be enabled. By way of a further example, a phone number information of caller can be combined with a call log (including duration) to determine, based on whether the duration is frequent and long, that the caller is an important person to the user. By way of still another example, a phone number of a caller can be combined with a time stamp to determine if a regular calling pattern can be found, and thereby suggest a user make a call at the appropriate time and potentially to a particular person.

By exploiting the implicitly extracted usage patterns, the device can suggest appropriate services which might correspond with the user's interests in a current context, as well as guide the user to explicitly input additional preference information. By way of example, the mobile phone could suggest "Meeting started. Would you like to set manner mode during it?" and the user could answer "yes or no, or ignore the suggestion."

Embodiments of the present invention may be implemented through general-purpose computer, for example, by implementing computer readable code/instructions stored on a medium, e.g., a computer-readable medium. The media may include, but is not limited to, a storage media such as magnetic storage media (ROMs, RAMs, floppy disks, magnetic tapes, etc.), optically readable media (CD-ROMs, DVDs, etc.). Embodiments of the present invention may also be embodied as a medium having a computer-readable code embodied therein for causing a number of computer systems connected via a network to perform distributed processing. Functional programs, codes and code segments for embodying the present invention may be easily deduced by programmers in the art which the present invention belongs to.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A mobile system, comprising:
a pattern extractor module to detect a pattern of operation of a mobile device based on operational data for the mobile device;
a pattern analyzer module configured to compare the pattern and the operational data of the mobile device, to signal that the pattern is a new pattern not previously recognized for the mobile system upon a result of the comparison indicating that the pattern is the new pattern, to identify the pattern as not being the new pattern upon the result of the comparison indicating that the pattern is not the new pattern, to perform, upon the signaling that the pattern is the new pattern, an initiating of a dialogue with a user to record information for the new pattern, including recording the new pattern based on a determination of whether a result of the dialogue indicates that the new pattern should be recorded, and
to determine, upon the identifying of the pattern as not being the new pattern, whether to initiate a dialogue with the user regarding the pattern upon a rule determination that an element of a corresponding rule is met for the pattern and to not initiate the dialogue with the user regarding the pattern based on the rule determination indicating that the element of the corresponding rule is not met for the pattern; and
a character agent module to initiate the dialogue with the user requesting guidance on implementation of an operation of the mobile device based on the pattern.

2. A mobile system, comprising:
a pattern extractor module to detect a pattern of operation of a mobile device based on operational data for the mobile device;
a pattern analyzer module to compare the pattern and the operational data of the mobile device to determine whether the pattern is a new pattern not previously recognized for the mobile system, and, if the pattern is determined to be the new pattern, initiate a dialogue with a user and record information for the new pattern based on a determination of whether a result of the dialog indicates the new pattern should be recorded, or, if the pattern is determined not to be the new pattern, determine whether to initiate a dialogue with the user regarding the pattern based on a rule determination that an element of a corresponding rule is met for the pattern and to not initiate the dialogue with the user regarding the pattern based on the rule determination that the element of the corresponding rule is not met for the pattern; and
a character agent module to initiate the dialogue with the user requesting guidance on implementation of an operation of the mobile device based on the pattern, wherein the determining of whether to initiate the dialogue further comprises basing the determination of whether to initiate the dialogue on a probability factor stored in the mobile system indicating a calculated probability that the user would prefer the operation of the mobile device be automatically implemented without dialogue rather than implemented with dialogue.

3. The mobile system of claim 2, wherein the probability that the user would prefer the operation of the mobile device be automatically implemented without dialogue is based on previous repetitive approvals by the user of previous dialogues regarding the pattern.

4. The mobile system of claim 2, wherein the probability factor further identifies a reluctance of the user to implement the operation of the mobile device and/or receive the dialogue.

5. The mobile system of claim 4, wherein the probability factor further identifying the reluctance of the user to implement the operation of the mobile device and/or receive the dialogue is based on previous repetitive disapprovals by the user of previous dialogues regarding the pattern.

6. The mobile system of claim 1, wherein the rule is a multi-element rule requiring at least two elements to be met for the pattern to match a previously known pattern of the mobile system.

7. The mobile system of claim 1, further comprising a device sensor system comprising at least one of:
a location information sensor module to determines a location of the mobile device;
a time sensor module to determine a current time;
an agenda sensor module to determine a current and upcoming agenda for the user from an agenda database stored in the mobile system;
a contacts sensor module to extract a contacts' phone number and additional information from a contacts database stored in the mobile system; and/or
a call log sensor module to extract time, duration and contact information from a call log stored in the mobile system.

8. The mobile system of claim 1, wherein the pattern extractor module compares operational data of at least one of at least one location data, at least one current time data, at least one agenda data, and/or at least one call log data and contacts data for the mobile device to extract the pattern.

9. The mobile system of claim 8, wherein the pattern analyzer module further compares the operational data with the rule to determine whether a current user behavior is contrary to the rule, indicating the pattern is the new pattern, whether the pattern is the new pattern based on repetitive user behaviors and also indicating a new rule, or whether the user's next action will be strongly predicted according to the pattern and based on the rule being met.

10. The mobile system of claim 1, wherein the character agent module modifies an appearance and behavior of a character agent interacting with the user.

11. The mobile system of claim 1, wherein the mobile device comprises a mobile communication system.

12. A mobile system, comprising:
a pattern extractor module to detect a pattern of operation of a mobile device based on operational data for the mobile device;
a pattern analyzer module configured to compare the pattern and the operational data of the mobile device, to signal that the pattern is a new pattern not previously recognized for the mobile system upon a result of the comparison indicating that the pattern is the new pattern, to identify the pattern as not being the new pattern upon the result of the comparison indicating that the pattern is not the new pattern, to perform, upon the signaling that the pattern is the new pattern, an initiating of a dialogue with a user to record information for the new pattern, including recording the information for the new pattern, and to determine, upon the identifying of the pattern as not being the new pattern, whether to initiate a dialogue with the user regarding the pattern based on a determination that an element of a corresponding rule is met for the pattern; and a character agent module to initiate the dialogue with the user requesting guidance on implementation of an operation of the mobile device based on the pattern, wherein the mobile device comprises a mobile communication system, and wherein when the rule corresponds to anticipating a next cell station based on the pattern, and the character agent module initiates the dialogue with the user regarding the next cell station.

13. The mobile system of claim 11, wherein the rule corresponds to agenda information and time information to anticipate a change in a messaging alert operation of the mobile device and automating the change in the messaging alert operation.

14. The mobile system of claim 13, wherein the automating of the change in the messaging alert operation comprises initiating the dialogue with the user as to whether to change the messaging alert operation of the mobile device based on previous changing of the messaging alert operation upon similar agenda information and time information.

15. The mobile system of claim 11, wherein the rule corresponds to at least two of call log information, contact information, and time information to anticipate a user's next messaging operation based on previous messaging operations.

16. The mobile system of claim 15, further comprising, upon anticipating the user's next messaging operation, initiating the dialogue with the user as to whether to initiate the next messaging operation.

17. The mobile system of claim 1, wherein a user response to the dialogue initiation comprises one of pressing an OK button, pressing a cancel button, ceasing operation of the mobile device, and manually inputting a response in a text box.

18. The mobile system of claim 1, wherein the initiating of the dialogue by the character agent module is delayed based upon an operational state of the mobile device.

19. The mobile system of claim 18, wherein the operational state includes at least one of a current occurrence of a call operation, a data transmission operation, and whether the mobile device is in a stand-by mode.

20. The mobile system of claim 18, wherein an urgency of the dialogue determines whether the character agent module delays initiation of the dialogue, thereby overriding the delaying based upon the operational state of the mobile device.

21. The mobile system of claim 20, wherein urgencies of potential dialogues can be set by a user to override the delaying based upon the operational state of the mobile device.

22. The mobile system of claim 20, wherein, when the character agent module overrides the delaying of the dialogue and initiates the dialogue, the dialogue is initiated through a beeper of the mobile device.

23. The mobile system of claim 20, wherein, when the character agent module overrides the delaying of the dialogue and initiates the dialogue, the dialogue is initiated through a vibrator of the mobile device.

24. An automated mobile operating method, comprising: extracting a pattern of operation of a mobile device based on operational data for the mobile device;

comparing the pattern and the operational data of the mobile device signaling that the pattern is a new pattern not previously recognized for the mobile system upon a result of the comparing indicating that the pattern is the new pattern, identifying the pattern as not being the new pattern upon the result of the comparing indicating that the pattern is not the new pattern, performing, upon the signaling that the pattern is the new pattern, an initiating of a dialogue with the user to record information for the new pattern, including recording the new pattern based on a determination of whether a result of the dialogue indicates that the new pattern should be recorded, and determining, upon the identifying of the pattern as not being the new pattern, whether to initiate a dialogue with the user regarding the pattern upon a rule determination that an element of a corresponding rule is met for the pattern and to not initiate the dialogue with the user regarding the pattern based on the rule determination indicating that the element of the corresponding rule is not met for the pattern; and performing the dialogue with the user, when initiated, requesting guidance on implementation of an operation of the mobile device based on the pattern.

25. An automated mobile operating method, comprising:
extracting a pattern of operation of a mobile device based on operational data for the mobile device;

comparing the pattern and the operational data of the mobile device to determine whether the pattern is a new pattern not previously recognized for the mobile system, and, if the pattern is determined to be the new pattern, initiating a dialogue with the user to record information for the new pattern, including recording the information for the new pattern based on a determination of whether a result of the dialog indicates the new pattern should be recorded, or, if the pattern is determined not to be the new pattern, determining whether to initiate a dialogue with the user regarding the pattern based on a rule determination that an element of a corresponding rule is met for the pattern and to not initiate the dialogue with the user regarding the pattern based on the rule determination that the element of the corresponding rule is not met for the pattern; and performing the dialogue with the user, when initiated, requesting guidance on implementation of an operation of the mobile device based on the pattern, wherein the determining of whether to initiate the dialogue further comprises basing the determination of whether to initiate the dialogue on a probability factor stored in the mobile system indicating a calculated probability that the user would prefer the operation of the mobile device be automatically implemented without dialogue rather than implemented with dialogue.

26. The method of claim 25, wherein the probability that the user would prefer the operation of the mobile device be automatically implemented without dialogue is based on previous repetitive approvals by the user of previous dialogues regarding the pattern.

27. The method of claim 25, wherein the probability factor further identifies a reluctance of the user to implement the operation of the mobile device and/or receive the dialogue.

28. The method of claim 27, wherein the probability factor further identifying the reluctance of the user to implement the operation of the mobile device and/or receive the dialogue is based on previous repetitive disapprovals by the user of previous dialogues regarding the pattern.

29. The method of claim 24, wherein the rule is a multi-element rule requiring at least two elements to be met for the pattern to match a previously known pattern.

30. The method of claim 24, further comprising at least one of:
   determining a location of the mobile device;
   determining a current time;
   determining a current and upcoming agenda for the user;
   extracting a contacts' phone number and additional information from a contacts database; and/or
   extracting time, duration and contact information from a call log.

31. The method of claim 24, wherein the extracting of the pattern further comprises comparing operational data of at least one of at least one location data, at least one current time data, at least one agenda data, and/or at least one call log data and contacts data for the mobile device to extract the pattern.

32. The method of claim 31, wherein the comparing the pattern and the operational data of the mobile device further comprises comparing the operational data with the rule to determine whether a current user behavior is contrary to the rule, indicating the pattern is the new pattern, whether the pattern is the new pattern based on repetitive user behaviors and also indicating a new rule, or whether the user's next action will be strongly predicted according to the pattern and based on the rule being met.

33. The method of claim 24, wherein the initiating of the dialogue further comprises modifying an appearance and behavior of a character agent interacting with the user.

34. The method of claim 24, wherein the mobile device performs mobile communication.

35. An automated mobile operating method, comprising:
   extracting a pattern of operation of a mobile device based on operational data for the mobile device;
   comparing the pattern and the operational data of the mobile device, signaling that the pattern is a new pattern not previously recognized for the mobile system upon a result of the comparing indicating that the pattern is the new pattern, identifying the pattern as not being the new pattern upon the result of the comparing indicating that the pattern is not the new pattern, performing, upon the signaling that the pattern is the new pattern, an initiating of a dialogue with the user to record information for the new pattern, including recording the information for the new pattern, and determining, upon the identifying of the pattern as not being the new pattern, whether to initiate a dialogue with the user regarding the pattern based on a determination that an element of a corresponding rule is met for the pattern; and
   performing the dialogue with the user, when initiated, requesting guidance on implementation of an operation of the mobile device based on the pattern,
   wherein the mobile device performs mobile communication, and, wherein when the rule corresponds to anticipating a next cell station based on the pattern and the character agent module initiates the dialogue with the user regarding the next cell station.

36. The method of claim 34, wherein the rule corresponds to agenda information and time information to anticipate a change in a messaging alert operation of the mobile device and automating the change in the messaging alert operation.

37. The method of claim 36, wherein the automating of the change in the messaging alert operation comprises initiating the dialogue with the user as to whether to change the messaging alert operation of the mobile device based on previous changing of the messaging alert operation upon similar agenda information and time information.

38. The method of claim 34, wherein the rule corresponds to at least two of call log information, contact information, and time information to anticipate a user's next messaging operation based on previous messaging operations.

39. The method of claim 38, further comprising, upon anticipating the user's next messaging operation, initiating the dialogue with the user as to whether to initiate the next messaging operation.

40. The method of claim 24, wherein a user response to the dialogue initiation comprises one of pressing an OK button, pressing a cancel button, ceasing operation of the mobile device, and manually inputting a response in a text box.

41. The method of claim 24, wherein the initiating of the dialogue is delayed based upon an operational state of the mobile device.

42. The method of claim 41, wherein the operational state includes at least one of a current occurrence of a call operation, a data transmission operation, and whether the mobile device is in a stand-by mode.

43. The method of claim 41, wherein an urgency of the dialogue determines whether to initiate the delay of the dialogue, thereby overriding the delaying based upon the operational state of the mobile device.

44. The method of claim 43, wherein urgencies of potential dialogues can be set by a user to override the delaying based upon the operational state of the mobile device.

45. The method of claim 43, wherein, when overriding the delaying of the dialogue, the dialogue is initiated through a beeping by a beeper of the mobile device.

46. The method of claim 43, wherein, when overriding the delaying of the dialogue, the dialogue is initiated through a vibrating by a vibrator of the mobile device.

47. A computer readable recording medium comprising computer readable instructions to control an implementation of the method of claim 24.

48. A computer readable recording medium comprising computer readable instructions to control an implementation of the method of claim 30.

49. A mobile phone comprising computer readable instructions implementing the method of claim 24.

* * * * *